United States Patent
Luo

(10) Patent No.: US 10,860,386 B2
(45) Date of Patent: Dec. 8, 2020

(54) DEVICE FOR MANAGING DISTRIBUTED STORAGE RESOURCES AND METHOD FOR MANAGING SUCH STORAGE RESOURCES

(71) Applicant: HONGFUJIN PRECISION ELECTRONICS (TIANJIN) CO., LTD., Tianjin (CN)

(72) Inventor: Cheng-Wei Luo, New Taipei (TW)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 16/444,187

(22) Filed: Jun. 18, 2019

(65) Prior Publication Data

US 2020/0341818 A1  Oct. 29, 2020

(30) Foreign Application Priority Data

Apr. 26, 2019 (CN) .......................... 2019 1 0345890

(51) Int. Cl.
G06F 9/50 (2006.01)
H04L 29/08 (2006.01)

(52) U.S. Cl.
CPC ........ G06F 9/5083 (2013.01); H04L 67/1097 (2013.01)

(58) Field of Classification Search
CPC .......................... G06F 9/5083; H04L 67/1097
See application file for complete search history.

(56) References Cited

U.S. PATENT DOCUMENTS

| | | | | |
|---|---|---|---|---|
| 10,298,684 B2 * | 5/2019 | Baptist | ................ | H04L 67/1097 |
| 10,444,996 B2 * | 10/2019 | Cashman | ............... | G06F 3/0665 |
| 2010/0121916 A1 * | 5/2010 | Lin | .......... | H04L 67/16 |
| | | | | 709/203 |
| 2013/0080408 A1 * | 3/2013 | Cashman | ............... | G06F 3/0608 |
| | | | | 707/692 |
| 2015/0100751 A1 * | 4/2015 | Cashman | ............... | G06F 3/0685 |
| | | | | 711/170 |
| 2015/0301757 A1 * | 10/2015 | Iwata | ................... | G06F 12/0871 |
| | | | | 711/114 |
| 2016/0085446 A1 * | 3/2016 | Kumabe | .................. | G06F 3/061 |
| | | | | 711/146 |
| 2017/0091032 A1 * | 3/2017 | Peake | .................... | G06F 3/0659 |
| 2017/0163730 A1 * | 6/2017 | Baptist | ................ | H04L 67/1004 |
| 2019/0220201 A1 * | 7/2019 | Jia | ............................ | G06F 3/061 |

* cited by examiner

*Primary Examiner* — Mohamed A. Wasel
(74) *Attorney, Agent, or Firm* — ScienBiziP, P.C.

(57) ABSTRACT

A method for managing storage resources includes calculating ratios of the quantity of data accessed to the current data occupation of storage unit of each server in a network. The method determines one or more servers each with ratio greater than a first preset value, and determines one or more servers each with ratio less than a second preset value. Next, the method outputs signals to control the servers with ratios each greater than the first preset value to transfer data to the one or more servers with ratios each less than the second preset value, until the ratios of all servers is less than or equal to the first preset value and greater than or equal to the second preset value. A related device for applying the method and a related non-transitory storage medium are also provided.

15 Claims, 3 Drawing Sheets

DEVICE FOR MANAGING DISTRIBUTED STORAGE RESOURCES AND METHOD FOR MANAGING SUCH STORAGE RESOURCES

FIELD

The subject matter herein generally relates to data storage.

BACKGROUND

The need for data storage is always increasing. Distributed storage is a common data storing method. A distributed storage system interconnects a number of storage devices to a number of servers via a network. In the prior art, a manner of balancing the storage load of the distributed storage system is to prioritize storing data to one or more servers corresponding to one or more storage devices with more storage spaces, to improve an usage of such storage resource. However, in real life applications, some data is accessed very frequently by a user and some data is accessed rarely, the aforementioned manner of load balancing may reduce a data quantity stored by the storage devices, but very frequently accessed data may decrease the service life of the storage devices.

SUMMARY

An embodiment of the present application provides a storage resource managing device, a storage resource managing method, an electronic device, and a non-transitory storage medium.

An embodiment of the present application provides a storage resource managing device. The device includes at least one communication unit, a storage system, and at least one processor. The at least one communication unit is configured to enable the storage resource managing device to communicate with a plurality of servers. The storage system stores one or more programs, which when executed by the at least one processor, causes the at least one processor to: obtain a quantity of data accessed of a storage device of each server in a preset period of time, calculate a ratio of the quantity of data accessed of each storage device in the preset period of time to a current data occupation of a storage device, determine one or more servers which each has ratio of the quantity of data accessed to the current data occupation greater than a first preset value, determine one or more servers which each has ratio as being less than a second preset value; and output one or more control signals to control the one or more servers which each has ratio greater than the first preset value to transfer the data to the one or more servers which each has ratio less than the second preset value, until the ratios of the all servers each is less than or equal to the first preset value and greater than or equal to the second preset value.

An embodiment of the present application provides a storage resource managing method. The storage resource managing method for a storage resource managing device, is applicable in a storage resource managing device with at least one communication unit configured to enable the storage resource managing device to communicate with a plurality of servers, a storage system, and at least one processor. The storage resource managing method comprises: the at least one processor obtaining a quantity of data accessed of a storage device of each server in a preset period of time, the at least one processor calculating a ratio of the quantity of data accessed of each storage device in the preset period of time to a current data occupation of a storage device, the at least one processor determining one or more servers which each has ratio of the quantity of data accessed to the current data occupation greater than a first preset value, the at least one processor determining one or more servers which each has ratio less than a second preset value, and the at least one processor outputting one or more control signals to control the one or more servers which each has ratio greater than the first preset value to transfer the data to the one or more servers which each has ratio less than the second preset value, until the ratios of the all servers each is less than or equal to the first preset value and greater than or equal to the second preset value.

An embodiment of the present application provides a non-transitory storage medium. The non-transitory storage medium stores a set of instructions, when the instructions is executed by at least one processor of a storage resource managing device, the at least one processor is configured to perform a storage resource managing method. The method comprises: the at least one processor obtaining a quantity of data accessed of a storage device of each server in a preset period of time, the at least one processor calculating a ratio of the quantity of data accessed of each storage device in the preset period of time to a current data occupation of a storage device, the at least one processor determining one or more servers which each has ratio of the quantity of data accessed to the current data occupation greater than a first preset value, the at least one processor determining one or more servers which each has ratio less than a second preset value, and the at least one processor outputting one or more control signals to control the one or more servers which each has ratio greater than the first preset value to transfer the data to the one or more servers which each has ratio less than the second preset value, until the ratios of the all servers each is less than or equal to the first preset value and greater than or equal to the second preset value.

The storage resource managing device, the storage resource managing method, and the non-transitory storage medium transfer the stored data according to a ratio of the overall quantity of accessed data to the current data occupation, to effectively balance the load between servers, thus increasing the service lives of the storage devices.

BRIEF DESCRIPTION OF THE DRAWINGS

Implementations of the present technology will now be described, by way of embodiment, with reference to the attached figures.

DETAILED DESCRIPTION

Figure 1:
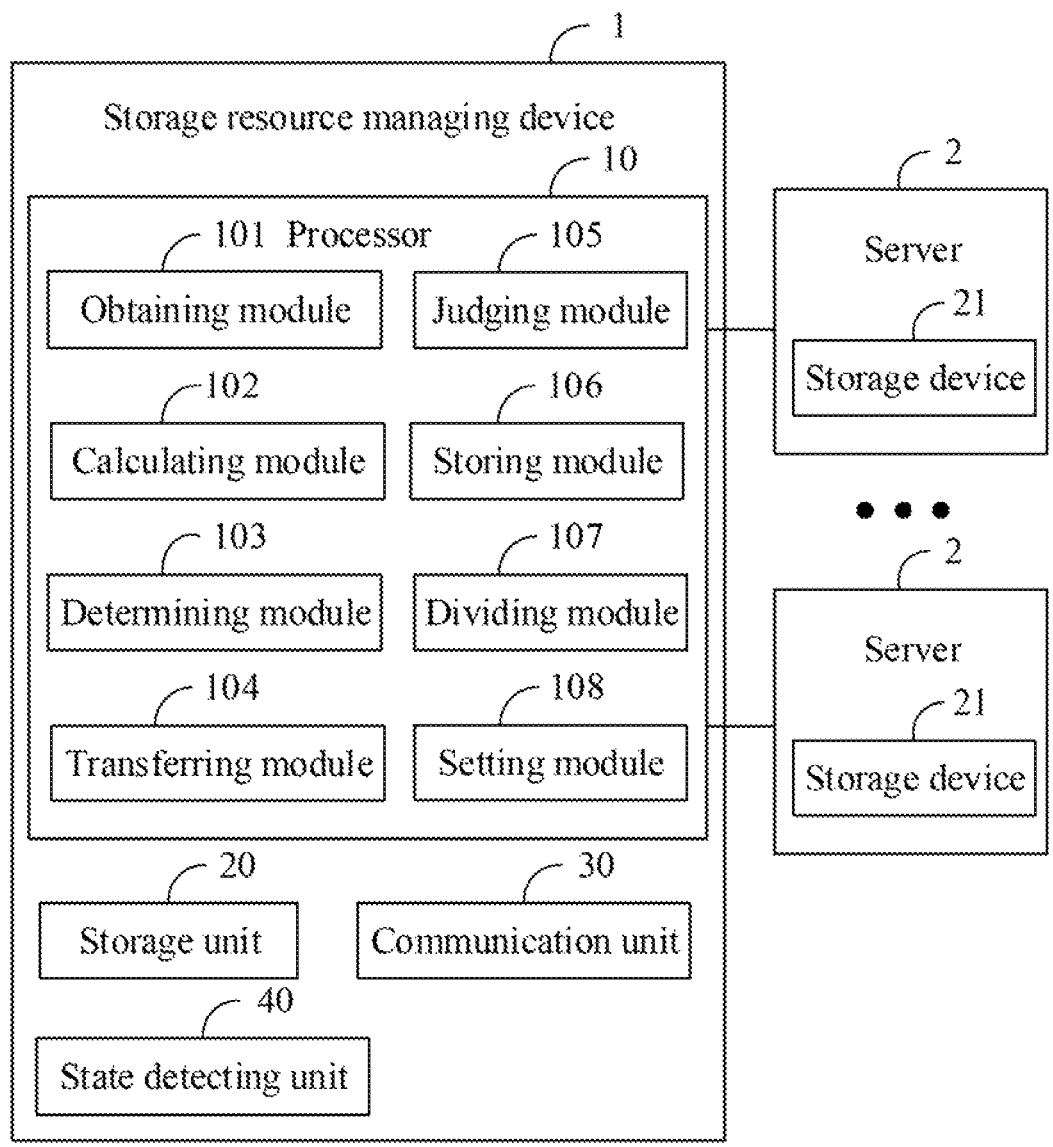
FIG. 1 illustrates a block view of an embodiment of a storage resource managing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

In general, the word "module," as used herein, refers to logic embodied in hardware or firmware, or to a collection of software instructions, written in a programming language. The software instructions in the modules can be embedded in firmware, such as in an erasable programmable read-only memory (EPROM) device. The modules described herein can be implemented as either software and/or hardware modules and can be stored in any type of computer-readable medium or other storage device.

The term "comprising" means "including, but not necessarily limited to"; it specifically indicates open-ended inclusion or membership in a so-described combination, group, series, and the like.

Embodiments of the present disclosure will be described with reference to the accompanying drawings.

FIG. 1 illustrates an embodiment of a device for managing storage resources.

The storage resource managing device 1 is connected to a number of servers 2 via a communication network. The storage resource managing device 1 is configured to manage a number of storage devices of the servers 2. In the embodiment, the storage resource managing device 1 is a management server.

The storage resource managing device 1 can include, but is not limited to, at least one processor 10, a storage unit 20, and at least one communication unit 30. In the embodiment, the storage unit 20 can be a read only memory (ROM) or a random access memory (RAM). The at least one communication unit 30 can connect to the servers 2 via a wired network or a wireless network. The storage resource managing device 1 and the servers 2 are arranged in an environment of a machine room. In the embodiment, the at least one communication unit can be a hub or a router. The at least one communication unit can be connected to each server 2 via a number of wires or be connected to each server 2 via a wireless network, for example, a WI-FI, a wireless local area network, or the like.

In the embodiment, the servers 2 are interconnected via a communication network.

Each server 2 can include, but is not limited to, a storage device 21. Each storage device 21 can be configured to store data. Preferably, each storage device 21 can be a hard disk. The stored data can be data of any nature.

The storage resource managing device 1 includes, but is not limited to, an obtaining module 101, a calculating module 102, a determining module 103, a transferring module 104, a judging module 105, a storing module 106, a dividing module 107, and a setting module 108. In the embodiment, the aforementioned modules can be a set of programmable software instructions stored in the storage unit 20 and executed by the processor 10 or a set of programmable software instructions or firmware in the processor 10.

The obtaining module 101 is configured to obtain quantity of access to data of the storage device 21 of each server 2 in a preset period of time.

In the embodiment, the storage resource managing device 1 further includes a state detecting unit 40. The state detecting unit 40 detects state of data accessing of each server 2, and records a quantity of data accessed of each server 2 during each data accessing. The obtaining module 101 obtains records of quantity of data accessed of each server 2 in a preset period of time, and calculates a total quantity of data accessed of each server 2 in the preset period of time. In the embodiment, the preset period of time is one month. In other embodiment, the preset period of time can be other time.

The calculating module 102 calculates a ratio of the quantity of data accessed of each storage device 21 in the preset period of time to a current data occupation of a storage device 21.

For example, the current data occupation of the storage device A of the server B is 10 gigabytes, that is, storage device A currently contains 10 GB of data, and the quantity of data accessed in the storage device A in the preset period of time is 50 gigabytes, thus the ratio between the two in the preset period of time is equal to five.

The determining module 103 determines one or more servers 2 which each has ratio of the quantity of data accessed to the current data occupation greater than a first preset value, and determines one or more servers 2 which each has the ratio as being less than a second preset value. In the embodiment, the first preset value is greater than the second preset value. For example, the first preset value can be two and the second preset value can be 0.5.

The transferring module 104 outputs one or more control signals to control the one or more servers 2 which each has ratio greater than the first preset value to transfer the data to the one or more servers 2 which each has ratio less than the second preset value, until the ratios of all the servers 2 each is less than or equal to the first preset value and greater than or equal to the second preset value.

In the embodiment, the transferring module 104 first outputs one or more control signals to one or more servers 2 which each has the greatest ratio over or beyond the first preset value, to control such servers 2 to transfer their data to the one or more servers 2 which each has the smallest ratio, such smallest ratio as being less than the second preset value in a sequence or simultaneously.

The judging module 105 determines whether the one or more servers 2 with the smallest ratio which each has real-time ratio greater than or equal to the first preset value in a real time in a data transferring process, and determine whether the one or more servers 2 with the greatest ratio which each has real-time ratio less than or equal to the second preset value in a real time in the data transferring process, to avoid the one or more servers which each has the ratio less than the second preset value receiving overmuch data, and avoid the one or more servers which each has the ratio greater than the first preset value transferring overmuch data.

In the embodiment, in the data transferring process, the calculating module 102 calculates a current ratio of each server 2 with the smallest ratio in a real time and a current ratio of each server 2 with the greatest ratio in a real time, and the judging module 105 determines whether the one or more servers 2 with the smallest ratio which each has real-time ratio greater than or equal to the first preset value in a real time according to a result of the calculation, and determines whether the one or more servers 2 with the greatest ratio which each has real-time ratio less than or equal to the second preset value in a real time according to the result of the calculation.

When a current ratio of each server 2 with the smallest ratio is greater than or equal to the first preset value, for example a current ratio of each server 2 with the smallest ratio is equal to the first preset value, namely, the one or more servers 2 with the smallest ratio cannot receive data any long to avoid from receiving overmuch data, the judging module 105 determines that the one or more servers 2 with the smallest ratio which each has real-time ratio greater than or equal to the first preset value. When a current ratio of each server 2 with the greatest ratio is less than or equal to the second preset value, for example a current ratio of each server 2 with the greatest ratio is equal to the second preset value, namely, the one or more servers 2 with the greatest ratio cannot transfer data any long to avoid from transferring overmuch data, the judging module 105 determines that the one or more servers 2 with the greatest ratio which each has real-time ratio less than or equal to the second preset value.

When the judging module 105 determines the one or more servers 2 with the smallest ratio which each has real-time ratio less than the first preset value, the transferring module 104 controls the one or more servers 2 with the greatest ratio to continuously transfer data thereto. When the judging module 105 determines the one or more servers 2 with the smallest ratio which each has real-time ratio greater than or equal to the first preset value, the transferring module 104 controls the one or more servers 2 with the greatest ratio to transfer data to the one or more servers 2 with the second smallest ratio. The other servers 2 can transfer data or receive data in a similar manner.

When the judging module 105 determines the one or more servers 2 with the greatest ratio which each has real-time ratio greater than the second preset value, the transferring module 104 controls the one or more servers 2 with the greatest ratio to continuously transfer data thereto. When the judging module 105 determines the one or more servers 2 with the greatest ratio which each has real-time ratio less than or equal to the second preset value, the transferring module 104 controls the one or more servers 2 with second greatest ratio to transfer the data to the one or more servers 2 which each has ratio less than the second preset value.

In the data transferring process, the one or more servers 2 each with ratio greater than the first preset value transfer the data in a sequence from big to small, as long as the ratios of those servers 2 are not less than the second preset value. In the same data transferring process, the one or more servers 2 with ratios less than the second preset value receive the data in a sequence from small to big as long as the ratios of those servers 2 are not greater than the first preset value.

If the number of servers 2, being one or more, with ratios each less than the second preset value is not enough to ensure that those servers 2 can receive the data transferred from the one or more servers 2 with ratios each greater than the first preset value, the transferring module 104 outputs a prompt or warning to an administrator to increase one or more servers 2.

The storing module 106 stores pre-stored data to the one or more servers 2 with ratios which each is smallest in the one or more servers 2 with ratios less than the second preset value in a sequence or simultaneously when the storage resource managing device 1 receives pre-stored data. The storing module 106 is further configured to store the rest of pre-stored data to the one or more servers 2 with second smallest ratio when the one or more servers 2 with smallest ratio which each has ratio increased to the first preset value by receiving the pre-stored data. The other pre-stored data can be stored in a similar manner.

The dividing module 107 divides the pre-stored data into a number of blocks according to a preset rule. In the embodiment, the preset rule is to maintain the integrity of the pre-stored data. For example, when the pre-stored data includes a number of applications, the dividing module 107 divides the data of one or more applications into corresponding blocks, thus the data of each application will be not divided into different blocks.

The storing module 106 is further configured to store the blocks of the pre-stored data to the storage devices 21 of the servers 2 according to size of each block. In the embodiment, the storing module 106 sorts the blocks by size from big to small, and stores each block in a sequence from big to small to the one or more servers 2 in a sequence of ratios from small to big. If the number of the blocks is greater than the number of the one or more servers 2 with ratios each less than the second preset value, the storing module 106 continuously stores the remaining blocks to the server 2 in a sequence of ratios from small to big.

In other embodiment, the setting module 108 sets a weighting of each server 2 according to a current quantity of data accessed of the storage device 21 of each server 2. In the embodiment, the weighting of each server 2 is inversely proportional to the quantity of data accessed of one storage device corresponding to the server 2. That is, when the quantity of data accessed of the server 2 decreases, the weighting of the server 2 increases, and when the quantity of data accessed of the server 2 increases, the weighting of the server 2 decreases. The storing module 106 is further configured to store the pre-stored data to the servers 2 corresponding to the weightings in a weighting sequence from high to low. In the embodiment, in the storing process, all the ratios of the one or more servers 2 receiving the pre-stored data must be each less than the first preset value.

Figure 2:
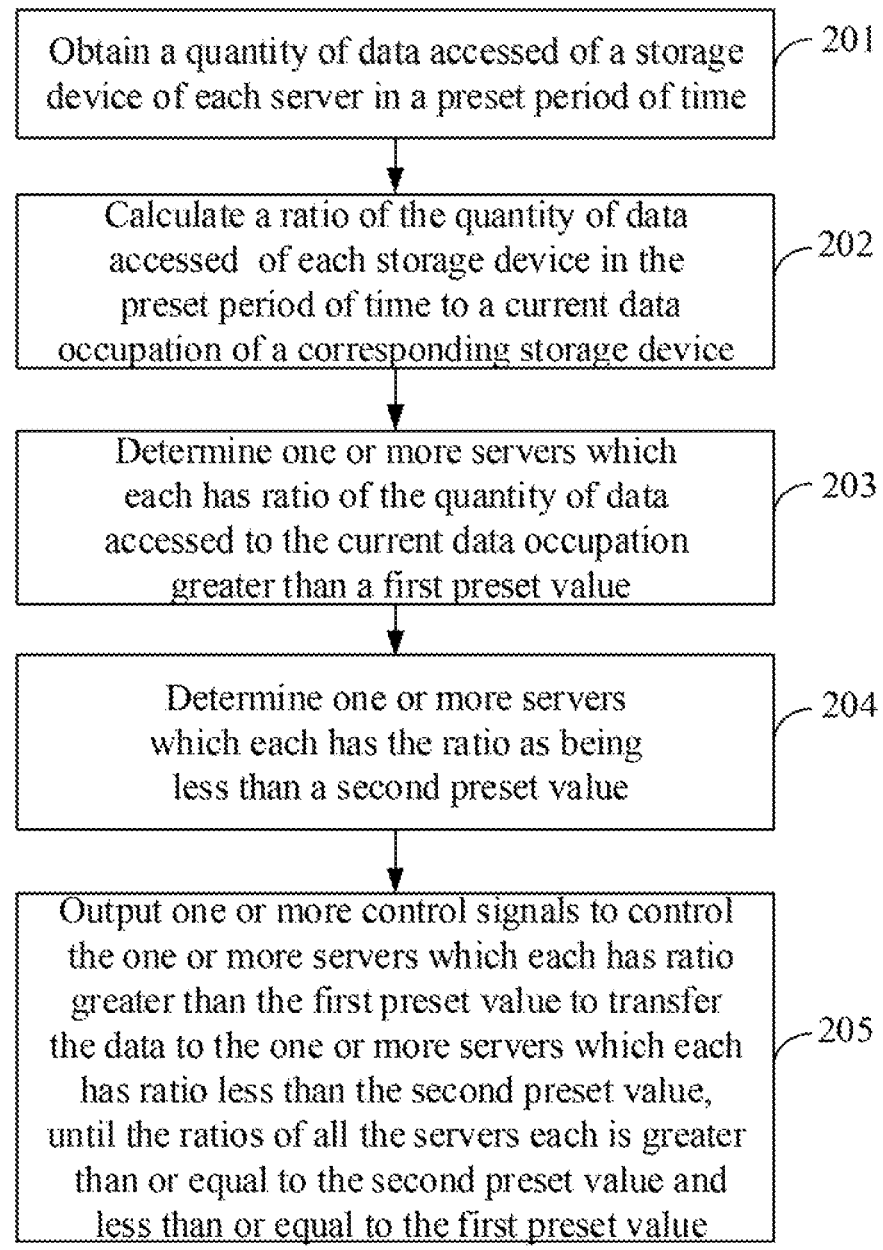
FIG. 2 illustrates a flowchart of an embodiment of a method for transferring data of a storage resource managing method.

FIG. 2 illustrates a flowchart of an embodiment of a method of transferring data of a storage resource managing method 200. The method 200 is provided by way of example, as there are a variety of ways to carry out the method 200. The method 200 described below can be carried out using the configurations illustrated in FIG. 1, for example, and various elements of these figures are referenced in the explanation of method. Each block shown in FIG. 2 represents one or more processes, methods or subroutines, carried out in the method. Additionally, the illustrated order of blocks is by example only and the order of the blocks can change. The method 200 can begin at block 201.

In block 201, obtaining a quantity of data accessed of a storage device of each server in a preset period of time.

In block 202, calculating a ratio of the quantity of data accessed of each storage device in the preset period of time to a current data occupation of a storage device.

In block 203, determining one or more servers which each has ratio of the quantity of data accessed to the current data occupation greater than a first preset value.

In block 204, determining one or more servers which each has the ratio as being less than a second preset value.

In block 205, outputting one or more control signals to control the one or more servers which each has ratio greater than the first preset value to transfer the data to the one or more servers which each has ratio less than the second preset value, until the ratios of all the servers each is less than or equal to the first preset value and greater than or equal to the second preset value.

In the embodiment, the block 205 includes:

Controlling first the one or more servers which each has greatest ratio greater than the first preset value to transfer the data to the one or more servers which each has smallest ratio as being less than the second preset value in a sequence or simultaneously;

Determining whether the one or more servers with the smallest ratio which each has real-time ratio greater than or equal to the first preset value in a real time in a data transferring process;

Determining whether the one or more servers with the greatest ratio which each has real-time ratio less than or equal to the second preset value in a real time in the data transferring process;

Controlling the one or more servers with the greatest ratio to transfer the data to the one or more servers which each has second smallest ratio when the one or more servers with the smallest ratio which each has real-time ratio greater than or equal to the first preset value;

Controlling the one or more servers with the second greatest ratio which each has a ratio greater than the first preset value to transfer the data to the one or more servers which each has ratio less than the second preset value when the one or more servers with the greatest ratio which each has real-time ratio less than or equal to the second preset value.

Figure 3:
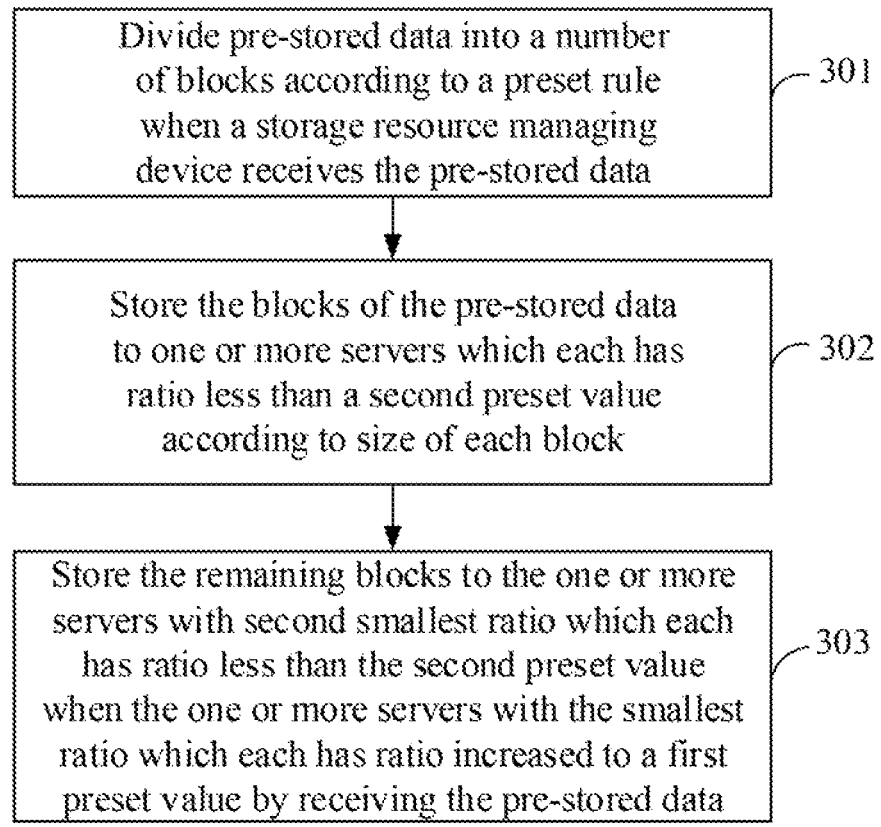
FIG. 3 illustrates a flowchart of an embodiment of a method for storing data of a storage resource managing method.

FIG. 3 illustrates a flowchart of an embodiment of a method for storing data of a storage resource managing method 300. The method 300 is provided by way of example, as there are a variety of ways to carry out the method 300. The method 300 described below can be carried out using the configurations illustrated in FIG. 1, for example, and various elements of these figures are referenced in the explanation of method. Each block shown in FIG. 3 represents one or more processes, methods or subroutines, carried out in the method. Additionally, the illustrated order of blocks is by example only and the order of the blocks can change. The method 300 can begin at block 301.

In block 301, dividing pre-stored data into a number of blocks according to a preset rule when the storage resource managing device receives the pre-stored data.

In block 302, storing the blocks of the pre-stored data to the one or more servers with smallest ratio which each has ratio less than the second preset value according to size of each block.

In block 303, storing the remaining blocks to the one or more servers with second smallest ratio which each has ratio less than the second preset value when the one or more servers with the smallest ratio which each has ratio increased to the first preset value by receiving the pre-stored data, and storing the blocks in a similar manner until the blocks are completely stored in the server.

In other embodiment, the method further includes:

Setting a weighting of each server according to a current quantity of data accessed of the storage device of each server;

Storing the pre-stored data to the servers corresponding to the weightings in a weighting sequence from high to low.

In other embodiment, setting a weighting of each server according to a current quantity of data accessed of the storage device of each server comprises:

Setting the weighting of each server being inversely proportional to the quantity of data accessed of one storage device corresponding to the server.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including, the full extent established by the broad general meaning of the terms used in the claims.

What is claimed is:

1. A storage resource managing device comprising:
    at least one communication unit configured to enable the storage resource managing device to communicate with a plurality of servers;
    a storage system;
    at least one processor; and
    the storage system storing one or more programs, which when executed by the at least one processor, causing the at least one processor to:
        obtain a quantity of data accessed of a storage device of each server in a preset period of time;
        calculate a ratio of the quantity of data accessed of each storage device in the preset period of time to a current data occupation of a storage device;
        determine one or more servers which each has ratio of the quantity of data accessed to the current data occupation greater than a first preset value;
        determine one or more servers which each has ratio as being less than a second preset value; and
        output one or more control signals to control the one or more servers which each has ratio greater than the first preset value to transfer the data to the one or more servers which each has ratio less than the second preset value, until the ratios of the all servers each is less than or equal to the first preset value and greater than or equal to the second preset value;
        control first the one or more servers which each has greatest ratio greater than the first preset value to transfer the data to the one or more servers which each has smallest ratio less than the second preset value;
        determine whether the one or more servers with the smallest ratio which each has real-time ratio greater than or equal to the first preset value in a real time in a data transferring process;
        determine whether the one or more servers with the greatest ratio which each has real-time ratio less than or equal to the second preset value in a real time in the data transferring process;
        control the one or more servers with the greatest ratio to transfer the data to the one or more servers which each has second smallest ratio less than the second preset value when the one or more servers with the smallest ratio which each has real-time ratio greater than or equal to the first preset value; and
        control the one or more servers with the second greatest ratio greater than the first preset value to transfer the data to the one or more servers which each has ratio less than the second preset value when the one or more servers with the greatest ratio which each has real-time ratio less than or equal to the second preset value.

2. The storage resource managing device as described in claim 1, further causing the at least one processor to:
    store pre-stored data to the one or more servers with ratios which each is smallest in the one or more servers with ratios less than the second preset value when the storage resource managing device receives the pre-stored data; and
    store the rest of pre-stored data to the one or more servers with second smallest ratio which has a ratio less than the second preset value when the one or more servers with the smallest ratio which each has ratio increased to the first preset value by receiving the pre-stored data.

3. The storage resource managing device as described in claim 2, further causing the at least one processor to:
divide the pre-stored data into a plurality of blocks according to a preset rule; and
store the blocks of the pre-stored data to the storage devices of the servers according to size of each block.

4. The storage resource managing device as described in claim 2, further causing the at least one processor to:
set a weighting of each server according to a current quantity of data accessed of the storage device of each server; and
store the pre-stored data to the servers corresponding to the weightings in a weighting sequence from high to low.

5. The storage resource managing device as described in claim 1, wherein:
the weighting of each server is inversely proportional to the quantity of data accessed of one storage device corresponding to the server.

6. A storage resource managing method for a storage resource managing device, applicable in a storage resource managing device with at least one communication unit configured to enable the storage resource managing device to communicate with a plurality of servers, a storage system, and at least one processor, comprising:
the at least one processor obtaining a quantity of data accessed of a storage device of each server in a preset period of time;
the at least one processor calculating a ratio of the quantity of data accessed of each storage device in the preset period of time to a current data occupation of a storage device;
the at least one processor determining one or more servers which each has ratio of the quantity of data accessed to the current data occupation greater than a first preset value;
the at least one processor determining one or more servers which each has ratio less than a second preset value; and
the at least one processor outputting one or more control signals to control the one or more servers which each has ratio greater than the first preset value to transfer the data to the one or more servers which each has ratio less than the second preset value, until the ratios of the all servers each is less than or equal to the first preset value and greater than or equal to the second preset value;
the at least one processor controlling first the one or more servers which each has greatest ratio greater than the first preset value to transfer the data to the one or more servers which each has smallest ratio less than the second preset value;
the at least one processor determining whether the one or more servers with the smallest ratio which each has real-time ratio greater than or equal to the first preset value in a real time in a data transferring process;
the at least one processor determining whether the one or more servers with the greatest ratio which each has real-time ratio less than or equal to the second preset value in a real time in the data transferring process;
the at least one processor controlling the one or more servers with the greatest ratio to transfer the data to the one or more servers which each has second smallest ratio less than the second preset value when the one or more servers with the smallest ratio which each has real-time ratio greater than or equal to the first preset value; and the at least one processor controlling the one or more servers with the second greatest ratio greater than the first preset value to transfer the data to the one or more servers which each has ratio less than the second preset value when the one or more servers with the greatest ratio which each has real-time ratio less than or equal to the second preset value.

7. The storage resource managing method as described in claim 6, further comprising:
the at least one processor storing pre-stored data to the one or more servers with ratios which each is smallest in the one or more servers with ratios less than the second preset value when the storage resource managing device receives the pre-stored data; and
the at least one processor storing the rest of pre-stored data to the one or more servers with second smallest ratio which has a ratio less than the second preset value when the one or more servers with the smallest ratio which each has ratio increased to the first preset value by receiving the pre-stored data.

8. The storage resource managing method as described in claim 7, further comprising:
the at least one processor dividing the pre-stored data into a plurality of blocks according to a preset rule; and
the at least one processor storing the blocks of the pre-stored data to the storage devices of the servers according to size of each block.

9. The storage resource managing method as described in claim 7, further comprising:
the at least one processor setting a weighting of each server according to a current quantity of data accessed of the storage device of each server; and
the at least one processor storing the pre-stored data to the servers corresponding to the weightings in a weighting sequence from high to low.

10. The storage resource managing method as described in claim 7, the at least one processor setting a weighting of each server according to a current quantity of data accessed of the storage device of each server comprising:
the at least one processor setting the weighting of each server being inversely proportional to the quantity of data accessed of one storage device corresponding to the server.

11. A non-transitory storage medium storing a set of instructions, when the instructions being executed by at least one processor of a storage resource managing device, the at least one processor being configured to perform a storage resource managing method, wherein the method comprises:
the at least one processor obtaining a quantity of data accessed of a storage device of each server in a preset period of time;
the at least one processor calculating a ratio of the quantity of data accessed of each storage device in the preset period of time to a current data occupation of a storage device;
the at least one processor determining one or more servers which each has ratio of the quantity of data accessed to the current data occupation greater than a first preset value;
the at least one processor determining one or more servers which each has ratio less than a second preset value; and
the at least one processor outputting one or more control signals to control the one or more servers which each has ratio greater than the first preset value to transfer the data to the one or more servers which each has ratio less than the second preset value, until the ratios of the all servers each is less than or equal to the first preset value and greater than or equal to the second preset value;

the at least one processor controlling first the one or more servers which each has greatest ratio greater than the first preset value to transfer the data to the one or more servers which each has smallest ratio less than the second preset value;

the at least one processor determining whether the one or more servers with the smallest ratio which each has real-time ratio greater than or equal to the first preset value in a real time in a data transferring process;

the at least one processor determining whether the one or more servers with the greatest ratio which each has real-time ratio less than or equal to the second preset value in a real time in the data transferring process;

the at least one processor controlling the one or more servers with the greatest ratio to transfer the data to the one or more servers which each has second smallest ratio less than the second preset value when the one or more servers with the smallest ratio which each has real-time ratio greater than or equal to the first preset value; and the at least one processor controlling the one or more servers with the second greatest ratio greater than the first preset value to transfer the data to the one or more servers which each has ratio less than the second preset value when the one or more servers with the greatest ratio which each has real-time ratio less than or equal to the second preset value.

12. The non-transitory storage medium as described in claim 11, wherein the method further comprises:

the at least one processor storing pre-stored data to the one or more servers with ratios which each is smallest in the one or more servers with ratios less than the second preset value when the storage resource managing device receives the pre-stored data; and the at least one processor storing the rest of pre-stored data to the one or more servers with the second smallest ratio which has a ratio less than the second preset value when the one or more servers with the smallest ratio which each has ratio increased to the first preset value by receiving the pre-stored data.

13. The non-transitory storage medium as described in claim 12, wherein the method further comprises:

the at least one processor dividing the pre-stored data into a plurality of blocks according to a preset rule; and the at least one processor storing the blocks of the pre-stored data to the storage devices of the servers according to size of each block.

14. The non-transitory storage medium as described in claim 12, wherein the method further comprises:

the at least one processor setting a weighting of each server according to a current quantity of data accessed of the storage device of each server; and the at least one processor storing the pre-stored data to the servers corresponding to the weightings in a weighting sequence from high to low.

15. The non-transitory storage medium as described in claim 14, the at least one processor setting a weighting of each server according to a current quantity of data accessed of the storage device of each server comprising:

the at least one processor setting the weighting of each server being inversely proportional to the quantity of data accessed of one storage device corresponding to the server.

* * * * *